(12) United States Patent
Clark et al.

(10) Patent No.: US 6,501,531 B1
(45) Date of Patent: Dec. 31, 2002

(54) METHOD OF UTILIZING WASTED NESTED SPACE

(75) Inventors: Dave Clark, Pittsford, NY (US); Michael Puyot, Escondido, CA (US); Rajan Ramaswamy, San Diego, CA (US); William Bland, Cardiff, CA (US); John Manard, San Diego, CA (US)

(73) Assignee: Phogenix Imaging, LLC, San Diego, CA (US)

( * ) Notice: Subject to any disclaimer, the term of this patent is extended or adjusted under 35 U.S.C. 154(b) by 0 days.

(21) Appl. No.: 10/001,642

(22) Filed: Oct. 31, 2001

(51) Int. Cl.[7] ............................................. G03B 27/52
(52) U.S. Cl. .............................. 355/40; 355/41; 355/77; 345/328; 345/751
(58) Field of Search ............................ 355/40, 41, 77; 101/248; 345/751, 328

(56) References Cited

U.S. PATENT DOCUMENTS

| | | | |
|---|---|---|---|
| 4,607,949 A | * | 8/1986 | Hakamada et al. ........... 355/40 |
| 4,839,829 A | * | 6/1989 | Freedman ................... 345/751 |
| 5,555,012 A | * | 9/1996 | Ellson et al. ................ 347/217 |
| 6,169,544 B1 | * | 1/2001 | Onoda ........................ 345/328 |
| 6,266,128 B1 | * | 7/2001 | Yoshida et al. ............... 355/40 |

FOREIGN PATENT DOCUMENTS

KR    2001-069516    * 7/2001

* cited by examiner

*Primary Examiner*—D Rutledge
(74) *Attorney, Agent, or Firm*—Stephen B. Salai, Esq.; Roger Aceto, Esq.; Harter, Secrest & Emery LLP

(57) ABSTRACT

A photofinishing system and method for utilizing otherwise wasted space on a sheet of photographic paper. The system includes a printer such as an ink jet printer, laser printer or digital silver-halide system for printing a set of desired images on a larger sheet of photographic paper. The system nests the images on the larger sheet so as to minimize wasted space. The amount of wasted space is determined and, if the space is large enough, the system prints an extra image in the space. The extra image can comprise a diagnostic pattern, promotional literature or an additional copy of at least one of the desired images.

12 Claims, 1 Drawing Sheet

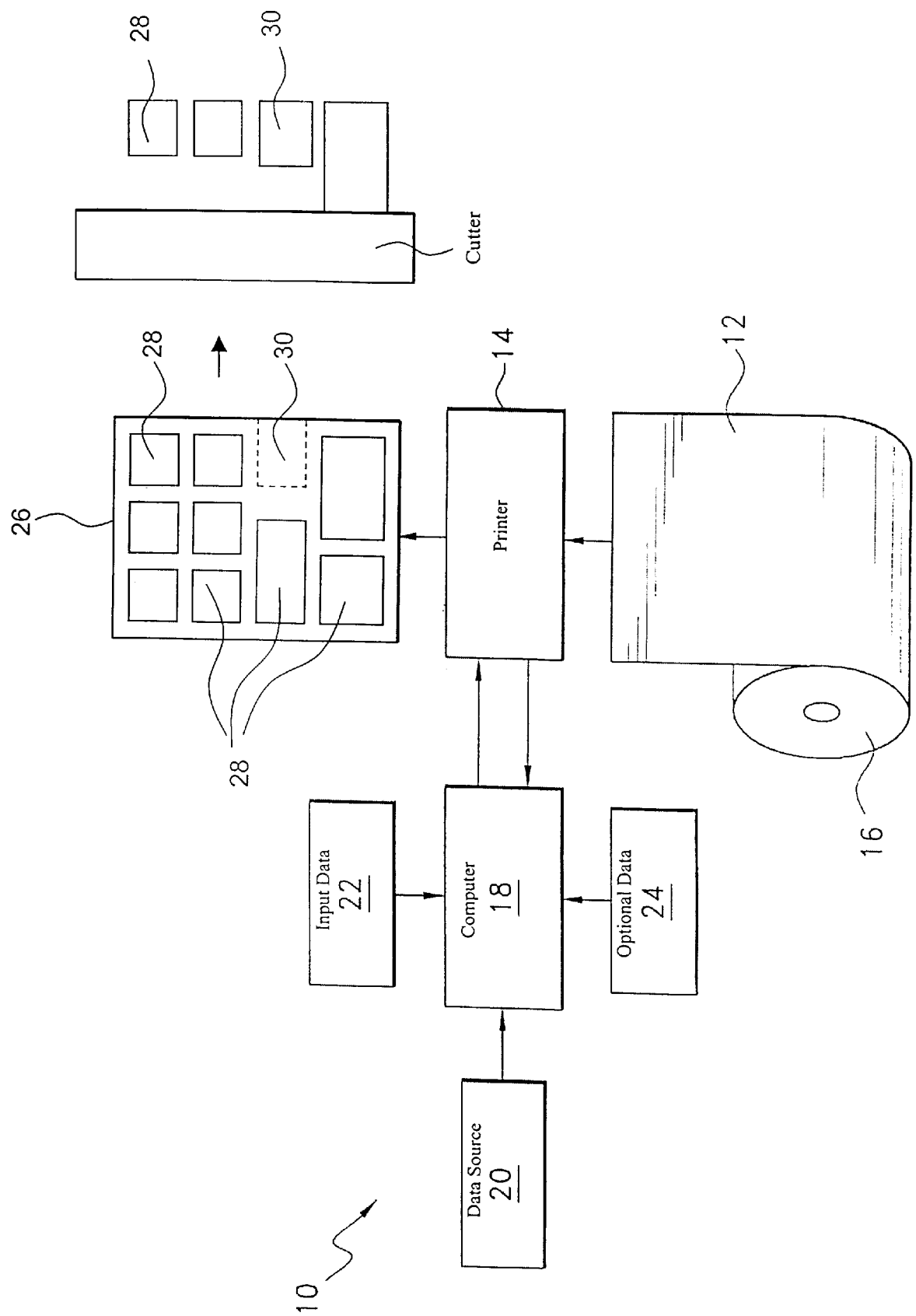

METHOD OF UTILIZING WASTED NESTED SPACE

TECHNICAL FIELD

The present invention relates to a method for utilizing an otherwise wasted resource such as the unused photographic print media left over from a photofinishing operation.

BACKGROUND OF THE INVENTION

In photofinishing operations it is conventional to develop and print photographs on roll stock photographic paper having a width that generally accommodates one size of print. After printing out a roll of photos on a strip of the roll stock, the strip is cut to provide the individual prints. Dedicating a given size of roll stock to the production of a given size photo is less flexible for fulfilling print orders and slows throughput. It requires the photofinishing operation either to have multiple machines, each dedicated to a given size of photo or it places a burden on the operator to change the print media from one size to another after completing orders.

Advancements in photofinishing allow for the production of photographs by ink jet printers, laser printers and other photofinishing printers including silver-halide systems that receive digital input and employ conventional wet chemistry output. Moreover the use of computers in connection with these advancements allows for further improvement. For example, it is not necessary to use roll stock having the width of a desired finished photo. A photofinishing printer now can generate photos of various sizes on a single sheet of print media. Also the images can be manipulated to nest various image sizes on a single larger sheet. Accordingly, a sheet or roll stock of a single width can be used to generate prints of various sizes for a single customer order.

However, photofinishing printers require periodic maintenance to insure print quality. To insure a consistent quality print, the printer is caused to produce a test pattern from time to time as a diagnostic operation. The test pattern may be used to determine color balance, test the alignment of the print heads, provide some other indicator of the health of the print head or otherwise provide an indicator of the state of other components of the system. The operator then analyzes the results of the printed test pattern and makes adjustments, or repairs or replaces the print heads as needed. The production of such a test pattern, whether occurring opportunistically or at periodic intervals between photofinishing operations, consumes a portion of the print media causing downtime from a productive operation.

In some cases during photofinishing operations, the nesting of various size prints on a single sheet produces waste space because of physical limitations on how the various sizes can be arranged on a larger sheet of a given width. When the sheet of prints is cut into individual photos, the wasted space is not suitable for further use and is scrapped. This means that the advantages of being able generate various size prints from a single width of print media are compromised by the economic loss of the unusable and scrapped portion of the media For these reasons it is desirable to provide for the utilization of otherwise wasted print media and to convert this waste media to an economic advantage whenever possible. It also is desirable to perform the necessary diagnostic testing of the photofinishing printer without undue interruption of the photofinishing operation and to utilize otherwise scrap portions of the print media for such testing.

Accordingly, an object of the present invention is to provide a photofinishing method and apparatus for producing various size prints from a sheet of print media wherein waste space on the sheet resulting from the nesting of photographic images of various sizes on a single sheet is utilized for constructive purposes.

Another object of the invention is to provide a photofinishing method and apparatus for utilizing print media that is otherwise left blank and wasted after completion of a customer order.

A further object is to provide a photofinishing operation in which otherwise wasted print media is used for diagnostic purposes or to produce an economic return

SUMMARY OF THE INVENTION

In accordance with the method of the present invention, a set of photographs is processed by a photofinishing system. This may include a customer order comprising photographs of a single size or of various sizes. In this respect the image data, including the number and size of prints desired as supplied by the customer is inputted into the system for processing. The data is communicated to the printing portion of the system, which includes a computer controlled photographic printer. The quantity of prints and the various sizes of prints to be made are analyzed by the computer software and based on this analysis, the most space efficient layout of the photographs is planned for the given width of print media that is being used. Included in the analysis for the most efficient layout of prints is a determination of the size and location of any waste space resulting from the planned printing layout. The system them can provide for the utilization of this waste space in any one of several ways.

For example, if the unused space is large enough, a diagnostic image or test print can be printed in the waste space. This diagnostic image can be some indicator of the health of the print head, a color balance test pattern or other indicator of the printer performance. Such a diagnostic image or test pattern can be set to run at set intervals and/or whenever the waste space is of a size sufficient to accommodate the image. The unused space also can be used to accommodate other printed images including promotional literature such as an advertisement or a coupon to be used by the customer for succeeding orders.

In cases where multiple customer orders have been received and are in queue in the controlling computer, the otherwise wasted space can be used by inserting the prints from one or more customers into the print layout of yet another customer. When the photofinishing operation of all jobs in the queue is completed, the prints can be separated and moved to the appropriate trays or bins containing the other prints of a given customer. Also, if promotional literature is printed in the space, it can be for the benefit of the customer whose prints are currently being nested or for customers with prints currently in the queue or for other subsequent customers.

The wasted space further can be used to print one or more extra photographs. In this respect the cost of the print media left blank and otherwise wasted is first determined. Depending upon the calculated size of the blank space that will result from the printing sequence, the operator can offer the customer the option of receiving additional prints or extra copies of one or more of the photographs in the order. Moreover, these can be offered to the customer at a reduced cost calculated to offset the cost of the otherwise wasted print media while still generating additional profit. To do this, the computer preferably includes software designed to calculate the cost of the otherwise wasted print media and any other consumable resource that is used in generating the additional prints, such as the ink used.

Accordingly, the present invention can be characterized in one aspect thereof by a method for profitably utilizing an otherwise wasted space on print media comprising:

arranging a quantity of photographic images on a larger sheet of print media so as to minimizes the amount of unused print media space;

determining the size of the unused print media space; and printing a desired image in the unused print media space if the unused print media space is large enough to accommodate the desired image.

In another aspect the present invention can be characterized by a photofinishing system comprising:

a photofinishing printer for printing a desired set of images on a larger sheet of print media;

the printer including means for determining an arrangement of the images to be printed on the sheet that minimizes the amount of blank space on the print media when the set is printed; and means for determining the size of the blank space and causing the printing of a desired extra image in the blank space if the size of the blank space is large enough to accommodate the extra image.

DESCRIPTION OF THE DRAWINGS

The sole FIGURE is a schematic drawing showing the sequence of operations of the present invention.

DETAILED DESCRIPTION OF THE INVENTION

Referring to the drawings, the sole FIGURE is a schematic representation of a photofinishing system generally indicated at 10. The system performs a sequence of steps in the method of the present invention for printing a series of images on a sheet of print media 12. The print media comprises a sheet of photographic paper or the like that is fed through a photo finishing printer 14. Preferably the print media is drawn from, a roll 16 so that the printer has, in effect, a relatively continuous supply of the print media. A computer 18, operatively connected to the printer, is arranged to receive photographic images contained by a data source 20. The computer is programmed to organize a plurality of the photographic images in an array that makes most efficient use of the space on the print media. The computer also can be programmed to accept an input data 22 representing instructions from the customer for printing the order. These may include for example, the quantity and size of prints that are desired. The computer also is arranged to receive an input 24 representing optional instructions from the customer as noted hereinbelow.

In operation, the images to be printed first are received from a data source 20. The data source can be any conventional image source including, but not limited to, a strip of photographic negatives, one or more actual photographic prints or other image that is scanned for input into the system. The data source also can be a compact disk or computer memory containing a digital representation of the images or other stored electronic or digital file that can be directly inputted into the photofinishing system.

Also inputted into the system is a customer instruction 22 indicating the number of copies of each image that is desired and optionally the print size. It should be appreciated that the images themselves may be of varying sizes or the customer may request enlargements of one or more images. The customer's instructions also may include a request to skip the printing of certain images contained by the data source 20. In any event, after the customer's instructions as to quantity, size, etc. is inputted into the system, computer 18 determines a printing layout for the given width of the print media. The print layout is one that makes the most efficient use of the space in order to minimize the amount of blank space on the print media.

Once the printing layout is planned, the size of any space to be left blank is determined. Thereafter, one of several events can occur for utilization of this otherwise blank or wasted space. If the size of this otherwise waste space permits, it can be used for the printing of a diagnostic or test pattern to monitor various aspects of the photofinishing printer 14. For example, test pattern among other things can check the health and alignment of the print heads of the printer or color quality. The printing of a test pattern can occur on a scheduled or routine basis and as part of the normal photofinishing operation and whenever the size of the blank space permits. As an alternative or in addition to the diagnostic image, the computer can routinely cause the printing of promotional literature in the space. The promotional literature preferably relates to the photofinishing operation and can include, for example, a cents-off coupon on the next customer order. The printing of promotional literature can occur between the times a diagnostic image is printed and, if space permits, both the diagnostic image and promotional literature can be printed on adjacent portions of the blank space.

After the size of the otherwise blank space is determined, the incremental cost of printing one or more additional photographs from the customer order in the blank space also can be determined. This determination includes, for example taking into consideration the cost of the otherwise wasted media and possibly the cost other resources required for printing any additional print such as ink, laminate or other consumable. Once this cost is determined, the customer can be given the option of receiving one or more additional prints at a reduced price so as to allow the operator to recoup at least the cost of the otherwise wasted print media and preferably make an additional profit. The determination of the additional costs and the customer's response to the offer comprises the optional input 24.

The computer 18, in response to the various inputs, then directs the printer 14 to produce the printed sheet 26 containing the selected images 28 needed to complete the customer's order along with the image or images selected for printing in the otherwise blank space 30. The individual images are then cut from the sheet and packaged to complete the customer's order.

It also is possible to utilize the otherwise blank space 30 for printing extra copies of photographs or printing promotional literature unrelated to the customer order otherwise appearing on the printed sheet 26. In this respect the input to computer 18 may include the orders and customer instructions 22 from several customers contained in a queue for processing. In this case, the blank space may be used to print an extra print for any of the orders in the queue. For example, the blank space 30 appearing on the sheet of prints for the first customer in the queue can be used for printing a photograph from the order of a second (or subsequent) customer in the queue. When the sheet is cut to separate the individual prints, the subsequent customer's print appearing in the space 30 is separated and later added to the prints of the subsequent customer.

Accordingly, it should be appreciated that the present invention accomplishes its intended objects in providing a photofinishing method and apparatus that utilizes otherwise wasted space resulting from the nesting of images on a print media. The method of the present invention allows for the utilization of such otherwise wasted spaced space in several ways. These include using the space for diagnostic testing of the health of the photofinishing printer or for producing promotional literature or for producing one or more additional prints not originally requested by a customer. Including a scheduled diagnostic test pattern in the blank space of a customer's order avoids the unnecessary downtime associated with printing the test pattern apart from the order. Using the space for extra prints at a small additional charge to the customer allows the operator to recoup the cost of the otherwise wasted print media. Printing promotional literature in the space is a further beneficial use of otherwise wasted print media.

It should be appreciated that the present invention is not limited to photofinishing but has application in any instance where a quantity of a product is requested by a customer and the products are made from a resource of a given size. For example, a customer order may involve the stamping of a given number of units from a roll of sheet metal. If the arrangement of the units on the roll result in an amount of the sheet being wasted, the customer can be offered one or more additional units at a reduced cost to recoup the cost of the otherwise wasted sheet metal.

Having described the invention in detail, what is claimed as new is:

1. A method for utilizing an otherwise wasted resource when making a plurality of products from a predetermined amount of the resource comprising:
   a) arranging to produce, in response to a customer order, a requested number of smaller products for cutting from a larger piece of a resource material drawn as sheet-stock from a supply roll so as to minimize the size of the unused and otherwise wasted uncut portion of the larger piece of the resource material that will remain after cutting of the larger piece to provide the requested number of smaller products;
   b) prior to cutting the larger piece to produce the requested number of smaller products, determining whether the size of a portion of the larger piece of resource material remaining after said cutting will permit the production of an additional one of the products,
   c) determining the incremental cost of producing an additional one of the products from the portion of the larger sheet;
   d) offering, prior to producing the requested number of products and subject to the customer's authorization, to provide an additional one of the smaller products in addition to the requested number at a reduced cost to the customer larger than the incremental cost; and
   e) cutting the sheet to separate each of the desired number of smaller products including any additional one of the products authorized by the customer from the larger piece of sheet-stock resource material.

2. A method as in claim 1 wherein the products are a plurality of individual photos, the resource material is a sheet of photographic print media and the additional product is another copy of at least one of the photos.

3. A photofinishing method comprising:
   a) arranging photographic images for printing onto a larger sheet of print media to provide an array of individual photographic images for cutting from the sheet after printing, the arranging being accomplished so as to minimize the portion of the larger sheet of printing media left blank space in the array;
   b) determining the size of a portion of the print media left blank by the array;
   c) printing an extra image in the portion of the print media left blank if the portion is sufficient to accommodate the extra image; and
   d) cutting the larger sheet to separate each of desired photographic images including the extra image from the larger sheet of print media.

4. A photofinishing method as in claim 3 wherein the extra image is a diagnostic pattern.

5. A photofinishing method as in claim 3 wherein the extra image comprises promotional literature.

6. A photofinishing method as in claim 3 wherein the extra image comprises an additional copy of at least one of the desired photographic images.

7. A photofinishing method as in claim 3 comprising:
   a) arranging the desired photographic images in response to a customer order for a selected number of copies of desired photographic images at a given price;
   b) determining the cost of printing an additional copy of at least one of the desired photographic images in the portion of print media left blank by the arrangement; and, prior to printing
   c) offering to the customer the additional copy of a desired photographic image at a reduction from the given price.

8. A photofinishing method as in claim 3 wherein:
   a) the arranging of the desired photographic images on the sheet is in response to an order of a first customer for a selected number of copies of the desired photographic images; and
   b) the printing of an extra image comprises printing a photographic image selected from an order of a second customer such that the arrangement includes photographic images from the orders of both the first and second customers.

9. A photofinishing system comprising:
   a) a photofinishing printer for printing a plurality of desired images on a larger sheet of print media;
   b) the printer including means for arranging the desired images in an array to be printed on the sheet that minimizes the amount of blank space on the print media when the array is printed, the array comprising aligned rows of images;
   c) means for determining the size of an otherwise blank space in a row of the array;
   d) means causing the printer to print an extra image in the otherwise blank space if the size of the otherwise blank space is large enough to accommodate the extra image; and
   e) a cutter to sever each of the images including the extra image from the larger sheet.

10. A photofinishing system as in claim 9 wherein the extra image is a test pattern for aiding in diagnosing the health of the printer.

11. A photofinishing system as in claim 10 wherein the extra image comprises promotional literature.

12. A photofinishing system as in claim 9 wherein the extra image is an additional one of the desired images.

* * * * *